(12) United States Patent
Hwang et al.

(10) Patent No.: US 11,661,883 B2
(45) Date of Patent: May 30, 2023

(54) HEAT MANAGEMENT SYSTEM

(71) Applicant: Hanon Systems, Daejeon (KR)

(72) Inventors: In-Guk Hwang, Daejeon (KR); Seong Hun Kim, Daejeon (KR); Hae-Jun Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/616,333

(22) PCT Filed: Jun. 3, 2020

(86) PCT No.: PCT/KR2020/007194
§ 371 (c)(1),
(2) Date: Dec. 3, 2021

(87) PCT Pub. No.: WO2020/246793
PCT Pub. Date: Dec. 10, 2020

(65) Prior Publication Data
US 2022/0325655 A1 Oct. 13, 2022

(30) Foreign Application Priority Data

Jun. 3, 2019 (KR) .................. 10-2019-0065341
Jun. 1, 2020 (KR) .................. 10-2020-0065909

(51) Int. Cl.
*F01P 5/10* (2006.01)
*F01P 11/02* (2006.01)
*F01P 11/04* (2006.01)

(52) U.S. Cl.
CPC ................ *F01P 5/10* (2013.01); *F01P 11/02* (2013.01); *F01P 11/04* (2013.01); *F01P 2005/105* (2013.01)

(58) Field of Classification Search
CPC ...... B60H 1/2221; F01P 5/10; F01P 2005/105
See application file for complete search history.

(56) References Cited

U.S. PATENT DOCUMENTS 6,016,774 A * 1/2000 Bokkers ............... F28D 1/0435
123/41.1
9,666,913 B2 * 5/2017 Elsaesser ............ H01M 10/625
(Continued)

FOREIGN PATENT DOCUMENTS

JP   2002332842 A   11/2002
JP   2005016385 A   1/2005
(Continued)

OTHER PUBLICATIONS

International Search Report issued in PCT/KR2020/007194 dated Sep. 3, 2020.

*Primary Examiner* — Long T Tran
(74) *Attorney, Agent, or Firm* — Norton Rose Fulbright US LLP; James R. Crawford

(57) ABSTRACT

A heat management system of the present invention comprises: a coolant heater for heating coolant; a first coolant pump which is connected to a coolant inlet or a coolant outlet of the coolant heater to pump the coolant and is coupled to the coolant heater; and a second coolant pump which is connected to a battery side to pump the coolant and is coupled to the coolant heater, wherein the coolant heater, the first coolant pump, and the second coolant pump are arranged in an engine room of a vehicle. Thus, a loss of coolant pressure can be reduced in a pipe which connects components constituting a coolant system of the vehicle, such that the performance of the system is improved and noise and vibration in the interior of the vehicle may be reduced.

11 Claims, 8 Drawing Sheets

(56) References Cited

U.S. PATENT DOCUMENTS

| | | | | |
|---|---|---|---|---|
| 2002/0035973 A1* | 3/2002 | Takahashi | ............... | B60K 6/26 |
| | | | | 903/952 |
| 2008/0128115 A1* | 6/2008 | Lee | ........................ | F28F 9/02 |
| | | | | 165/96 |
| 2012/0102995 A1* | 5/2012 | Sakata | .................... | B60L 58/26 |
| | | | | 62/238.1 |
| 2014/0287284 A1* | 9/2014 | Shibata | ............... | H01M 10/625 |
| | | | | 429/72 |
| 2015/0140366 A1* | 5/2015 | Nicholls | ............ | H01M 10/633 |
| | | | | 429/50 |
| 2016/0297280 A1* | 10/2016 | Riederer | ................ | F25B 21/04 |
| 2019/0322155 A1* | 10/2019 | Kim | .................. | B60H 1/00278 |

FOREIGN PATENT DOCUMENTS

| | | | |
|---|---|---|---|
| JP | 2014190296 A | 10/2014 |
| KR | 20140147365 A | 12/2014 |
| KR | 20180065332 A | 6/2018 |
| WO | 2018009122 A1 | 1/2018 |

\* cited by examiner

HEAT MANAGEMENT SYSTEM

CROSS REFERENCE TO RELATED APPLICATIONS

This application is a national phase under 35 U.S.C. § 371 of International Application No. PCT/KR2020/007194 filed on Jun. 3, 2020, which claims the benefit of priority from Korean Patent Application Nos. 10-2020-0065909 filed on Jun. 1, 2020 and 10-2019-0065341 filed on Jun. 3, 2019. The entire contents of these applications are incorporated herein by reference in their entirety.

TECHNICAL FIELD

The present invention relates to a heat management system in which components constituting a coolant system for heating of a vehicle and cooling and heating of electronic components are modularized.

BACKGROUND ART

Recently, an electric vehicle has become prominent as a solution to implementation of environmentally-friendly technology and a problem such as energy depletion in a vehicle field.

The electric vehicle run using a motor driven by receiving power supplied from a battery or a fuel cell, and thus, emits less carbon and produces less noise. In addition, the electric vehicle is environmentally friendly because it uses a motor having more excellent energy efficiency than an existing engine.

Such an electric vehicle is provided with a heat management system for cooling and heating for interior air conditioning and cooling of electronic components such as a driving motor, a battery, and an inverter.

The heat management system includes a coolant system for interior heating of the vehicle and cooling and heating of the electronic components. However, in the coolant system, the number of components configured in order to circulate a coolant and the number of pipes connecting these components to each other are large, such that a process of assembling the coolant system is complicated and difficult. In addition, lengths of the pipes connecting the components to each other are increased, such that performance loss of the refrigerant system due to a pressure drop of the flowing coolant occurs.

RELATED ART DOCUMENT

Patent Document

KR 2014-0147365 A (2014.12.30.)

DISCLOSURE

Technical Problem

An object of the present invention is to provide a heat management system capable of decreasing pressure loss of a coolant in pipes connecting components constituting a coolant system for interior heating of a vehicle and cooling and heating of electronic components to each other, improving performance of the coolant system, and easily managing noise and vibrations by decreasing a distance between the components.

Technical Solution

In one general aspect, a heat management system includes: a coolant heater heating a coolant; a first coolant pump connected to a coolant inlet or a coolant outlet of the coolant heater to pump the coolant and coupled to the coolant heater; and a second coolant pump connected to a temperature control object side to pump the coolant and coupled to the coolant heater, wherein the coolant heater, the first coolant pump, and the second coolant pump are disposed in an engine room of a vehicle.

A coolant inlet of the first coolant pump may be connected to the coolant outlet of the coolant heater, and the first coolant pump may be disposed below the coolant outlet of the coolant heater in a height direction.

The heat management system may further include a connection pipe connecting the coolant outlet of the coolant heater and the coolant inlet of the first coolant pump to each other.

The coolant heater may have an inlet pipe and an outlet pipe formed on one side thereof, the inlet pipe being the coolant inlet, and the outlet pipe being the coolant outlet, and the first coolant pump and the second coolant pump may be disposed on one side of the coolant heater.

A first inlet pipe which is a coolant inlet of the first coolant pump and a second inlet pipe which is a coolant inlet of the second coolant pump may be formed to protrude from surfaces facing each other, respectively, and the first inlet pipe of the first coolant pump and the second inlet pipe of the second coolant pump may be disposed to at least partially overlap each other in a central axis direction of the first inlet pipe or the second inlet pipe.

The first inlet pipe of the first coolant pump may be disposed to overlap a body and the second inlet pipe of the second coolant pump in the central axis direction of the first inlet pipe or the second inlet pipe, and the second inlet pipe of the second coolant pump may be disposed to overlap a body and the first inlet pipe of the first coolant pump in the central axis direction of the first inlet pipe or the second inlet pipe.

A first outlet pipe which is a coolant outlet of the first coolant pump may be formed on an upper side of the first coolant pump in a height direction, and a second outlet pipe which is a coolant outlet of the second coolant pump may be formed on an opposite side to the first outlet pipe in the height direction.

A fixing bracket separately formed may be coupled to the coolant heater, and a first fixing part to which the first coolant pump is coupled and a second fixing part to which the second coolant pump is coupled may be formed on the fixing bracket.

The first fixing part may include a 1-1-th fixing part coupled and fixed coupled to the coolant heater and a 1-2-th fixing part coupled and fixed to the 1-1-th fixing part, and the first coolant pump may be disposed and fixed between the 1-1-th fixing part and the 1-2-th fixing part.

The second fixing part may include a 2-1-th fixing part coupled and fixed coupled to the coolant heater and a 2-2-th fixing part coupled and fixed to the 2-1-th fixing part, and the second coolant pump may be disposed and fixed between the 2-1-th fixing part and the 2-2-th fixing part.

The coolant inlet of the coolant heater may be connected to a coolant outlet of a water-cooled condenser in which a refrigerant and the coolant exchange heat with each other.

A coolant outlet of the first coolant pump may be connected to a heater core exchanging heat with air supplied to an interior of the vehicle.

A coolant inlet of the second coolant pump may be connected to a reservoir tank storing and replenishing the coolant, and a coolant outlet of the second coolant pump may be connected to the temperature control object side.

Advantageous Effects

In the heat management system according to the present invention, a distance between components constituting a coolant system for interior heating of a vehicle and cooling and heating of electronic components is decreased, such that pressure loss of a coolant in pipes connecting the components to each other may be decreased, performance of the coolant system may be improved and performance of the coolant system may thus be improved, and the coolant system may be compactly configured.

In addition, noise and vibrations may be easily managed through a disposition structure of the coolant heater and the coolant pumps, and noise and vibrations in an interior of a vehicle may be decreased.

BEST MODE

Hereinafter, a heat management system according to the present invention having the configuration as described above will be described in detail with reference to the accompanying drawings.

Figure 1:
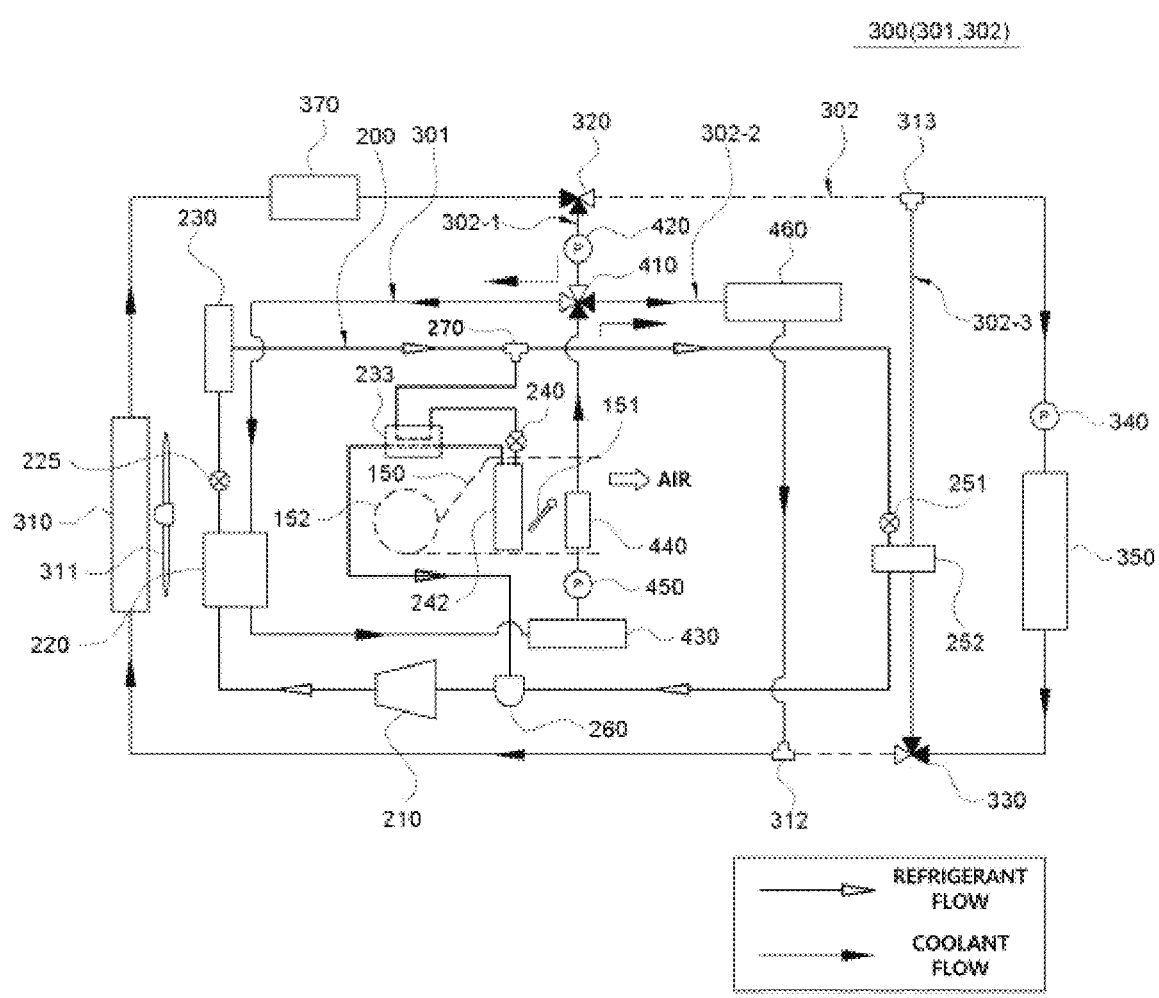
FIG. 1 is a configuration diagram illustrating an entire heat management system including a coolant system and a refrigerant system according to an embodiment of the present invention.
Figure 2:
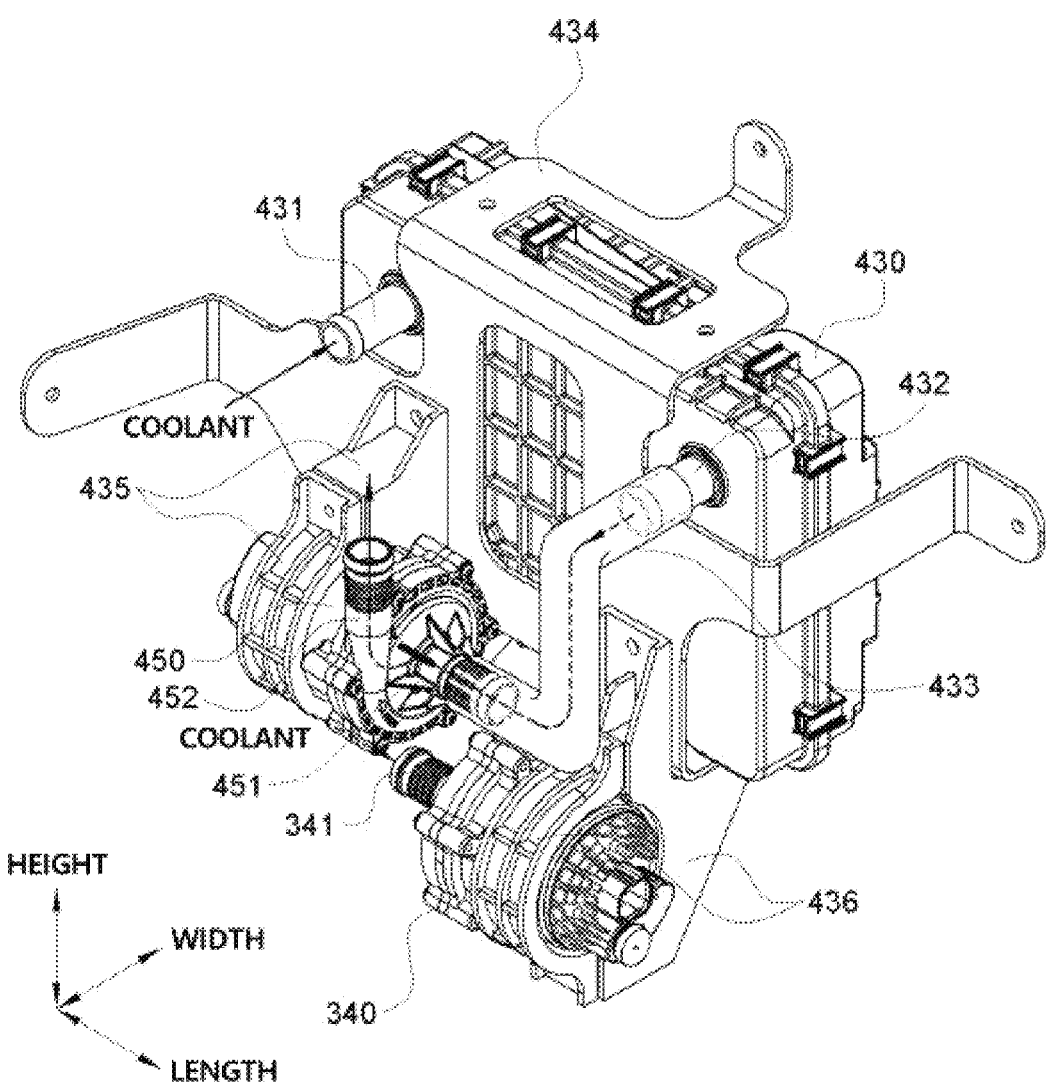
FIG. 2 is an assembled perspective view illustrating a coupled structure of a coolant heater, a first coolant pump, and a second coolant pump in the heat management system according to an embodiment of the present invention.
Figure 3:
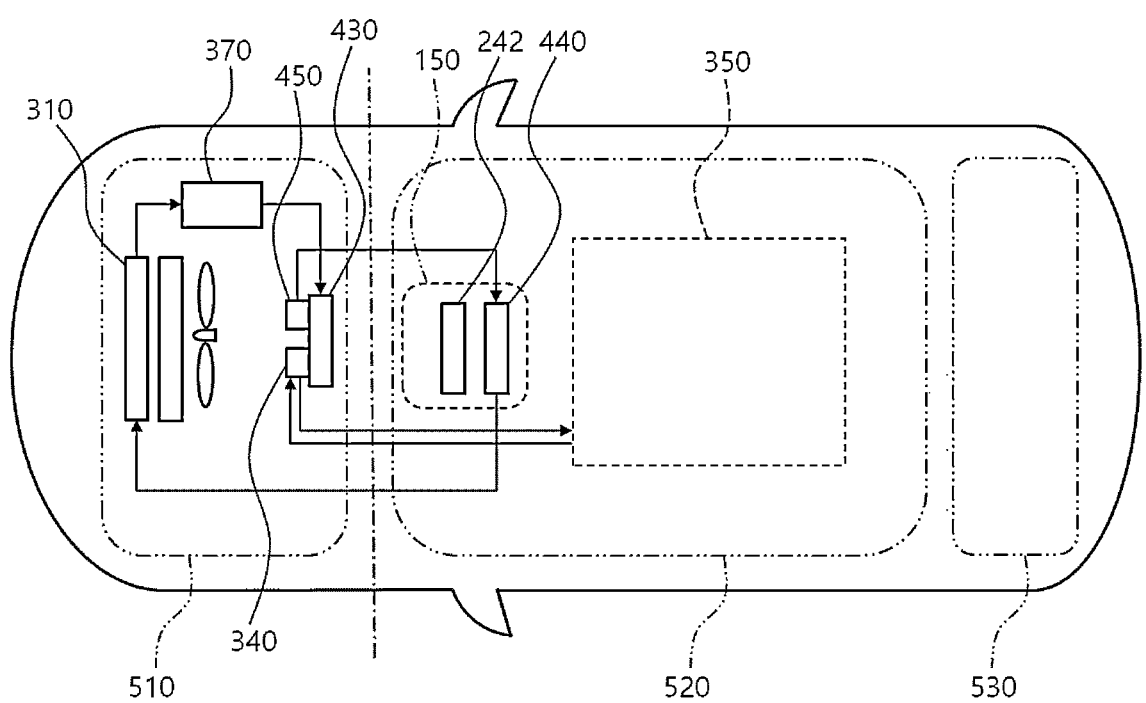
FIG. 3 is a configuration diagram illustrating an in-vehicle disposition structure of the coolant heater, the first coolant pump, and the second coolant pump in the heat management system according to an embodiment of the present invention.
Figure 4:
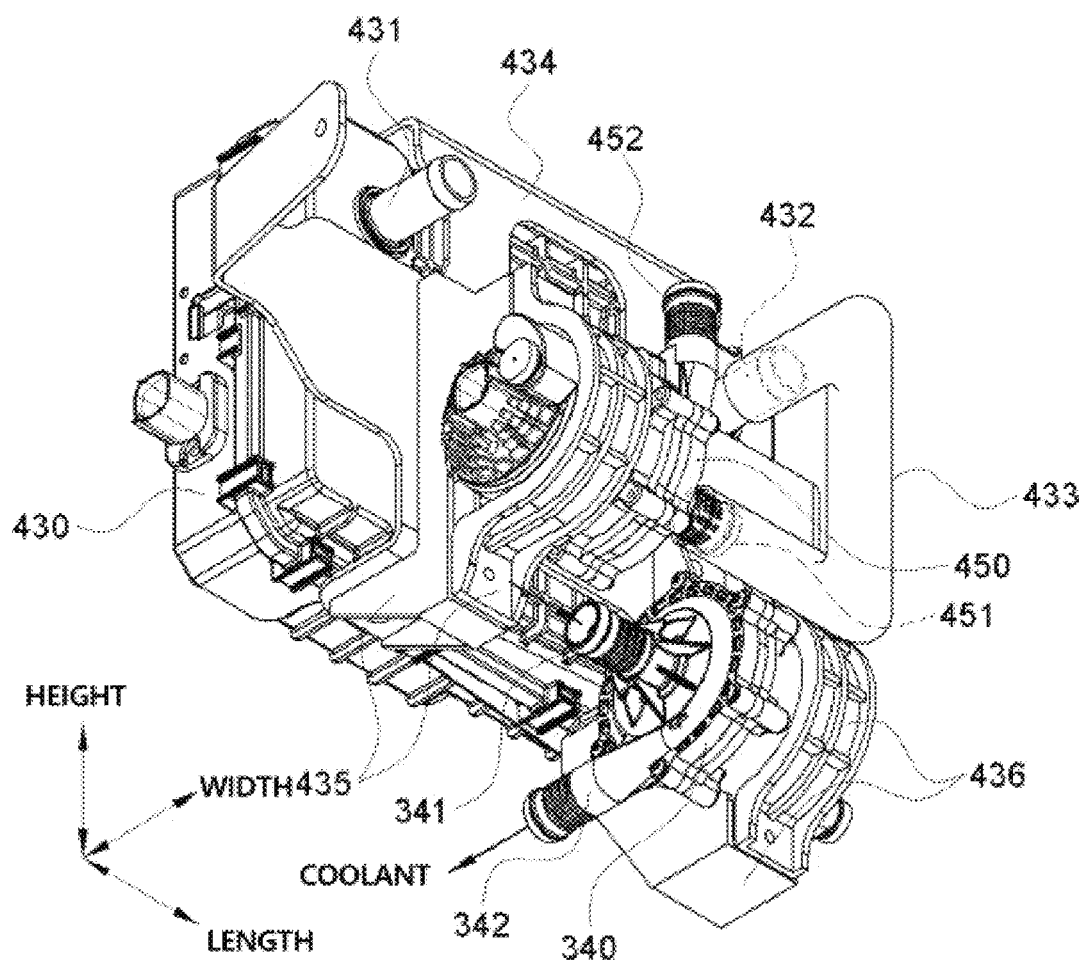
FIGS. 4 to 8 are, respectively, an assembled perspective view, an exploded perspective view, a front view, a left side view, and a right side view illustrating the coupled structure of the coolant heater, the first coolant pump, and the second coolant pump in the heat management system according to an embodiment of the present invention.
Figure 5:
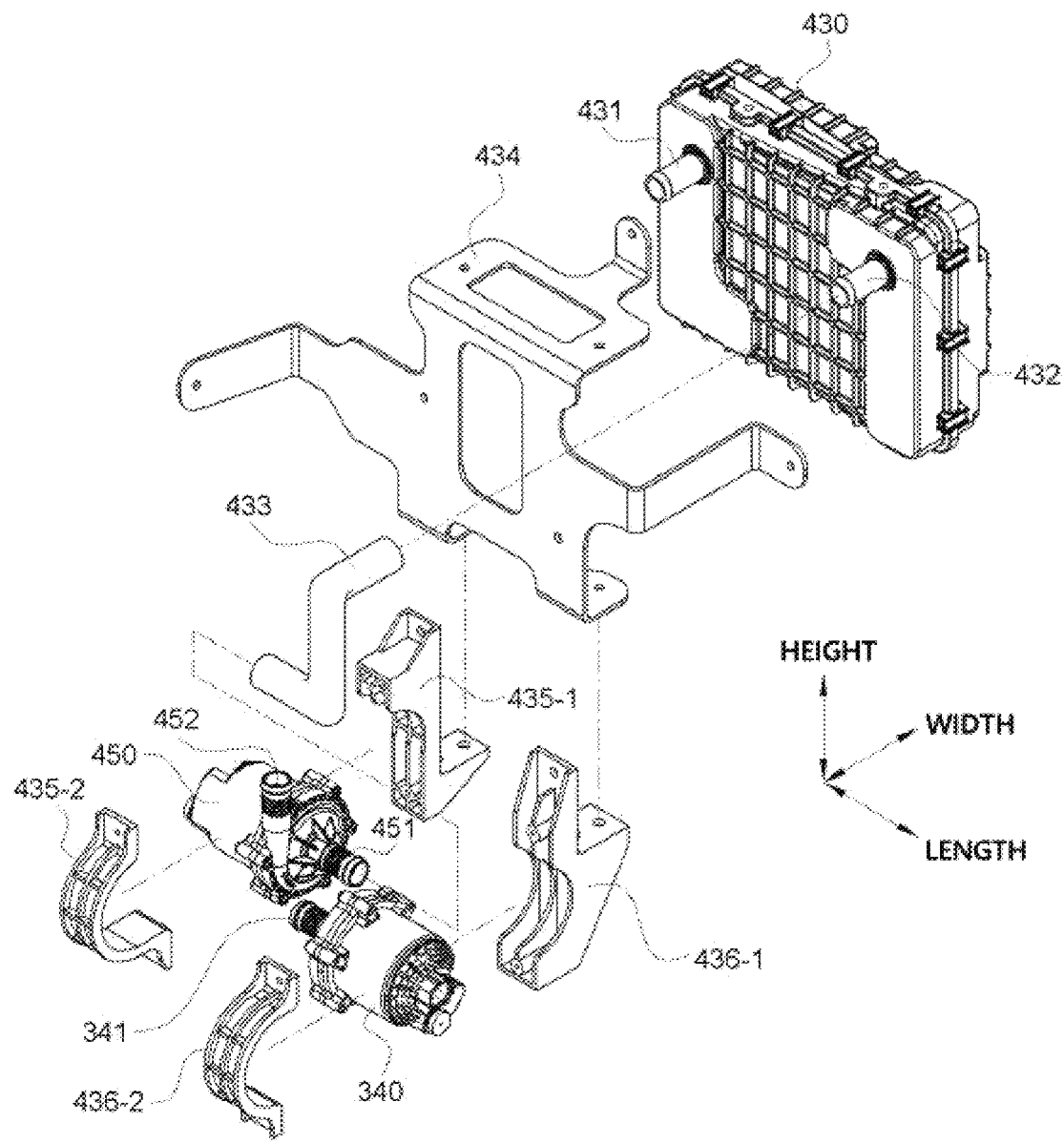
Figure 6:
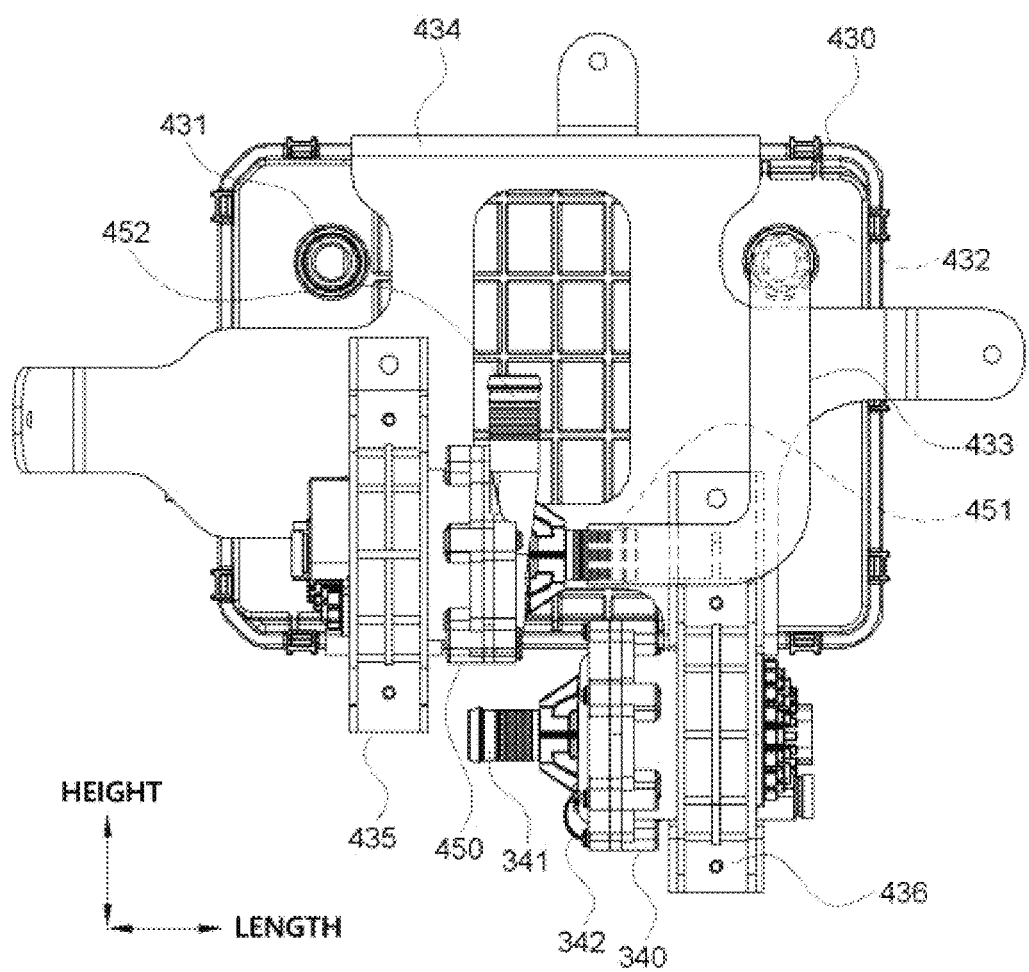
Figure 7:
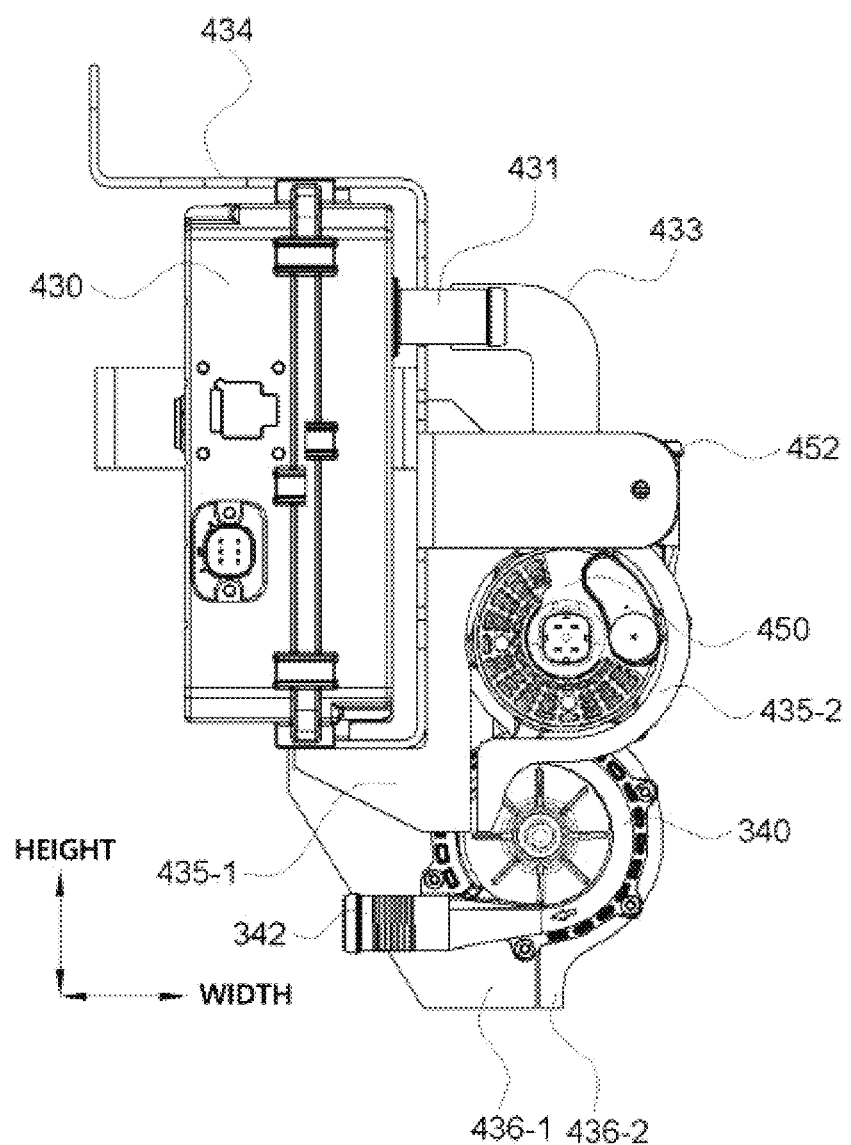
Figure 8:
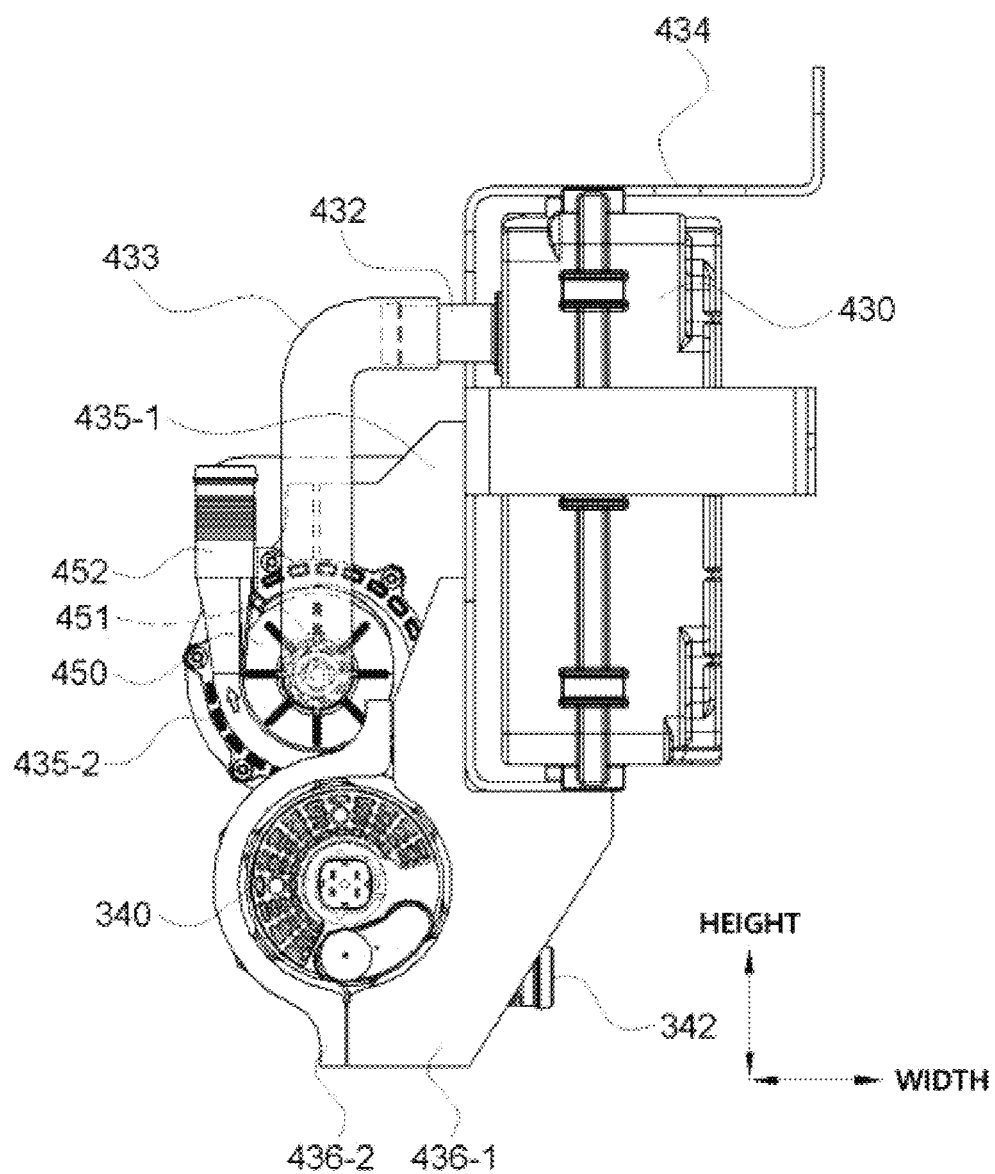

FIG. 1 is a configuration diagram illustrating an entire heat management system including a coolant system and a refrigerant system according to an embodiment of the present invention, FIG. 2 is an assembled perspective view illustrating a coupled structure of a coolant heater, a first coolant pump, and a second coolant pump in the heat management system according to an embodiment of the present invention, and FIG. 3 is a configuration diagram illustrating an in-vehicle disposition structure of the coolant heater, the first coolant pump, and the second coolant pump in the heat management system according to an embodiment of the present invention.

As illustrated in the drawings, the heat management system according to the present invention may be configured to mainly include a coolant heater 430, a first coolant pump 450, and a second coolant pump 340.

The coolant heater 430 is a device heating a coolant, and may be connected to a downstream side, in a flow direction of the coolant, of a water-cooled condenser 220 in which a refrigerant and the coolant exchange heat with each other. In addition, the coolant heater 430 may be, for example, an electric heater, and may be various heaters such as a sheath heater or a PTC heater.

The first coolant pump 450 is a pump pumping the coolant along a coolant line connected thereto, and may be connected to an upstream side or a downstream side of the coolant heater 430 in the flow direction of the coolant. That is, as illustrated in the drawings, a coolant inlet of the first coolant pump 450 may be connected to a coolant outlet of the coolant heater 430 through a connection pipe 433 or the like, and although not illustrated, a coolant outlet of the first coolant pump 450 may be connected to a coolant inlet of the coolant heater 430. In addition, the first coolant pump 450 may be fixedly coupled to one side of the coolant heater 430.

The second coolant pump 340 is a pump pumping the coolant along a coolant line connected thereto, and may be connected to an upstream side of a temperature control object 350 side in the flow direction of the coolant. In addition, the temperature control object 350 side may be a cooling system configured so that the coolant is circulated through a temperature control object 350 and a chiller 252. Here, the temperature control object 350 may be a battery or the like, and the chiller 252 may be a battery chiller.

In addition, the second coolant pump 340 may be coupled and fixed to one side of the coolant heater 430, and the second coolant pump 340 may be disposed to be spaced apart from the first coolant pump 340.

Therefore, the coolant heater 430, the first coolant pump 450, and the second coolant pump 340 may be configured in an integral module form.

Here, referring to FIG. 3, the coolant heater 430, the first coolant pump 450, and the second coolant pump 340 may be disposed inside an engine room 510 of a vehicle. That is, the coolant heater 430, the first coolant pump 450, and the second coolant pump 340 configured as an integral module may be disposed in the engine room 510, which is a space partitioned from and spaced apart from an interior 520 in which a passenger rides in the vehicle. In addition, in a case where the vehicle is an electric vehicle, the battery, which is the temperature control object 350, may be generally disposed on a floor side of the vehicle, which is outside corresponding to a position of the interior 520 of the vehicle, or may be disposed on a trunk 530 side.

Accordingly, in the heat management system according to the present invention, a distance between components constituting the coolant system for interior heating of the vehicle and cooling and heating of electronic components is decreased, such that pressure loss of the coolant in pipes connecting the components to each other may be decreased and performance of the coolant system may thus be improved, and the coolant system may be compactly configured.

In addition, noise and vibrations may be easily managed through a disposition structure of the coolant heater and the coolant pumps, and the coolant pumps may be disposed at positions spaced apart from the interior of the vehicle by a long distance, and thus, noise and vibrations in the interior of the vehicle may be decreased.

In addition, referring to FIG. 1, a heat management system including a coolant system 300 and a refrigerant system 200 according to the present invention may mainly include the coolant system 300 in which a coolant is circulated to heat an interior and cooling and heating components and the refrigerant system 200 in which a refrigerant is circulated to cool the interior. In addition, the coolant system 300 may include a heating line 301 for interior heating and a cooling line 302 for cooling and heating temperature control objects 350 and 460.

Here, the heating line 301 of the coolant system 300 according to the present invention may include the water-cooled condenser 220, the coolant heater 430, the first coolant pump 450, the heater core 440, and a first directional selector valve 410.

The refrigerant and the coolant may exchange heat with each other while passing through the water-cooled condenser 220. The coolant heater 430 is a device heating the coolant, and may be disposed on and connected to the rear of the water-cooled condenser 220 and an upstream side of the first coolant pump 450 in the flow direction of the coolant. The first coolant pump 450 is a means pumping the coolant so that the coolant is circulated along the heating line 301, and may be disposed on a downstream side of the coolant heater 430 and an upstream side of the heater core 440 in a flow direction of the coolant and be installed on a coolant line. The heater core 440 may be disposed in an air conditioner 150 of the vehicle, and may be disposed on and connected to the downstream side of the coolant heater 430 in the flow direction of the coolant. The first directional selector valve 410 may be installed between the heater core 440 and the water-cooled condenser 220, and may be configured to selectively connect the heating line 301 and a cooling line 302 to be described later to each other or block the connection between the heating line 301 and the cooling line 302. In more detail, the first directional selector valve 410 may be installed on the heating line 301, two coolant line pipes may be connected to the first directional selector valve 410, one first connection line 302-1 branched from one side of the cooling line 302 may be connected to the first directional selector valve 410, and one second connection line 302-2 branched from the other side of the cooling line 302 may be connected to the first directional selector valve 410 That is, at the first directional selector valve 410, four coolant lines may be connected to each other so as to meet, and the first directional selector valve 410 may be a four-way selector valve capable of controlling a state in which the four coolant lines are connected to each other or the connection between the four coolant lines is blocked.

In addition, in the coolant system 300, the cooling line 302 may include a radiator 310, a reservoir tank 370, a second directional selector valve 320, a third coolant pump 420, the first directional selector valve 410, the temperature control object 460, a first coolant joint 313, a second coolant joint 312, the second coolant pump 340, the temperature control object 350, the chiller 252, and a third directional selector valve 330. The radiator 310 is a heat exchanger cooling the coolant heat-exchanged with the temperature control objects 350 and 460, and may be cooled in an air-cooled manner by a cooling fan 311. The reservoir tank 370 may serve to store the coolant and replenish the coolant line in which the coolant is insufficient with the coolant, and may be installed on a coolant line of an upstream side of the third coolant pump 420 and the second coolant pump 340 in the flow direction of the coolant. The second directional selector valve 320 may be installed on the cooling line 302, two coolant pipes may be connected to the second directional selector valve 320, and the first directional selector valve 410 and the second directional selector valve 320 may be connected to each other by the first connection line 302-1 so that the heating line 301 and the cooling line 302 are connected to each other. That is, at the second directional selector valve 320, three coolant lines may be connected to each other so as to meet, and the second directional selector valve 320 may be a three-way selector valve capable of controlling a state in which the three coolant lines are connected to each other or the connection between the three coolant lines is blocked. The third coolant pump 420 is a means pumping the coolant so that the coolant is circulated along the cooling line 302. In addition, the third coolant pump 420 may be installed on the first connection line 302-1 between the first directional selector valve 410 and the second directional selector valve 320, and the coolant may flow from the second directional selector valve 320 toward the first directional selector valve 410 by an operation of the third coolant pump 420. The first directional selector valve 410 is the same as described in the above-described heating line 301. The temperature control object 460 may be disposed on the second connection line 302-2 connecting the first directional selector valve 410 and the second coolant joint 312 to each other, and an electronic component 460 may be cooled by the coolant. In addition, the temperature control object 460 may be a driving motor, an inverter, an on-board charger (OBC), or the like. The second coolant pump 340 is a means pumping the coolant so that the coolant is circulated along the cooling line 302. In addition, the second coolant pump 340 is installed in a coolant line between the first coolant joint 313 and the temperature control object 350, and the coolant may flow from the second coolant pump 340 toward the temperature control object 350. A battery, which is the temperature control object 350, is a power source of the vehicle, and may be a driving source of various electronic components in the vehicle. Alternatively, the battery may serve to store electricity by being connected to a fuel cell or may serve to store electricity supplied from the outside. In addition, the temperature control object 350 may be disposed on a coolant line between the second coolant pump 340 and the third directional selector valve 330. Therefore, the temperature control object 350 may be cooled or heated by exchanging heat with the flowing coolant. The first coolant joint 313 is installed on a coolant line of a downstream side of the second directional selector valve 320 in the flow direction of the coolant, and at the first coolant joint 313, three coolant lines are connected to each other so as to meet. That is, the first coolant joint 313 is installed so that both sides thereof are connected to the cooling line 302, and a third connection line 302-3 may be connected to a lower side of the first coolant joint 313. Here, the third connection line 302-3 may be connected to the first coolant joint 313 so as to pass through the chiller 252. The second coolant joint 312 may be installed at a point where a downstream side of the second connection line 302-2 meets the cooling line 302, and at the second coolant joint 312, three coolant lines are connected to each other so as to meet. That is, the second coolant joint 312 is installed so that both sides thereof are connected to the cooling line 302, and the second connection line 302-2 may be connected to an upper side of the second coolant joint 312. The chiller 252 is the same as described in the above-described heating line 301. The third directional selector valve 330 is installed on a coolant line between the temperature control object 350 and the second coolant joint 312, two coolant pipes are connected to the third directional selector valve 330, and the third connection line 302-3 is connected to an upper side of the third directional selector valve 330, such that the temperature control object 350 and the third connection line 302-3 may be configured to be connected to each other in parallel. In this case, the second directional selector valve 320 may be a three-way selector valve capable of controlling a state in which three coolant lines are connected to each other or the connection between the three coolant lines is blocked.

In addition, the refrigerant system 200 may include a compressor 210, the water-cooled condenser 220, a first expansion valve 225, an air-cooled condenser 230, a first connection block 270, a second expansion valve 240, an evaporator 242, a refrigerant heat exchanger 233, an accumulator 260, a third expansion valve 251, and the chiller 252.

The compressor 210 may be an electric compressor driven by receiving power, and serves to suck and compress the refrigerant and discharge the compressed refrigerant toward the water-cooled condenser 220. The water-cooled condenser 220 serves to heat-exchange the refrigerant discharged from the compressor 210 with the coolant to condense the refrigerant as a liquid-phase refrigerant and send the liquid-phase refrigerant to the first expansion valve 225. The first expansion valve 225 may serve to throttle and expand the refrigerant, bypass the refrigerant, or block a flow of the refrigerant, and may be disposed on a downstream side of the water-cooled condenser 220 in a flow direction of the refrigerant. The air-cooled condenser 230 may serve as a condenser or an evaporator, and a function of the air-cooled condenser 230 may vary according to a role of the first expansion valve 225. That is, in a case where the refrigerant system 200 is used as an air conditioner loop, the first expansion valve 225 is completely opened to allow the refrigerant to pass therethrough, and the air-cooled condenser 230 serves as a condenser together with the water-cooled condenser 220, and in a case where the refrigerant system 200 is used as a heat pump loop, the first expansion valve 225 throttles the refrigerant, and the air-cooled condenser 230 serves as an evaporator. In addition, the air-cooled condenser 230 may be cooled or heated in an air-cooled manner by the external air. The first connection block 270 may be formed on a downstream side of the air-cooled condenser 230 in the flow direction of the refrigerant and has a first port, a second port, and a third port formed therein, and these three ports communicate with each other through a flow path passing through the first connection block. Therefore, a refrigerant line may be branched into two refrigerant lines in the first connection block 270, one refrigerant line may be configured to be connected to the evaporator 242, and the other refrigerant line may be configured to be connected to the chiller 252. The second expansion valve 240 and the third expansion valve 251 may serve to throttle or pass the refrigerant or block a flow of the refrigerant. In addition, the second expansion valve 240 and the third expansion valve 251 may be configured in parallel with each other. That is, the second expansion valve 240 may be connected to one of the two refrigerant lines branched in the first connection block 270 and the third expansion valve 251 is connected to the other of the two refrigerant lines. In this case, the second expansion valve 240 may be disposed on an upstream side of the evaporator 242 in the flow direction of the refrigerant, and the third expansion valve 251 may be disposed on an upstream side of the chiller 252. The evaporator 242 is disposed on a downstream side of the second expansion valve 240 in the flow direction of the refrigerant, and is provided inside the air conditioner 150 of the vehicle, and air flowing by a blower 152 of the air conditioner may be cooled while passing through the evaporator 242 and supplied to the interior of the vehicle to be used for interior cooling of the vehicle. The refrigerant heat exchanger 233 serves to exchange heat between the refrigerant introduced into the second expansion valve 240 and the refrigerant discharged from the evaporator 242 to improve cooling performance. Here, the refrigerant heat exchanger 233 is configured so that the refrigerant line connecting the first connection block 270 and the second expansion valve 240 to each other passes therethrough and the refrigerant line connecting the evaporator 242 and the accumulator 260 to each other passes therethrough, such that heat exchange between the refrigerant before being introduced into the second expansion valve 240 and the refrigerant after passing through the evaporator 242 may occur in the refrigerant heat exchanger 233. Therefore, the refrigerant may be further cooled before being introduced into the second expansion valve 240, cooling performance through the evaporator 242 may be improved, and efficiency of the refrigerant system may be improved, by the refrigerant heat exchanger 233. The chiller 252 may be disposed on a downstream side of the third expansion valve 251 in the flow direction of the refrigerant, and may exchange heat with the coolant to cool the coolant. Therefore, the second expansion valve 240 and the evaporator 242 form one set, and the third expansion valve 251 and the chiller 252 form another set, such that two sets are configured in parallel on the refrigerant lines. In addition, the refrigerant lines may be joined to rear sides of the evaporator 242 and the chiller 252 in the flow direction of the refrigerant to be formed as a single coolant line. The accumulator 260 may separate the refrigerant into a liquid-phase refrigerant and a gas-phase refrigerant, and supply only the gas-phase refrigerant to the compressor 210. Here, the accumulator 260 may be disposed at and connected to a point where refrigerant lines on a rear side of the evaporator 242 and the downstream side of the chiller 252 join, and may be disposed on an upstream side of the compressor 210 in the flow direction of the refrigerant.

In addition, the air conditioner 150 has the blower 152 installed on one side thereof so as to blow air, and a temperature control door 151 may be installed inside the air conditioner 150. In addition, the evaporator 242 and the heater core 440 disposed in the air conditioner may be disposed and configured so that the air discharged from the blower 152 may pass through only the evaporator 242 according and be then introduced into the interior or pass through the evaporator 242, pass through the heater core 440, and be then introduced into the interior, to an operation of the temperature control door 151.

Hereinafter, a configuration of the heat management system according to an embodiment of the present invention described above will be described in more detail.

FIGS. 4 to 8 are, respectively, an assembled perspective view, an exploded perspective view, a front view, a left side view, and a right side view illustrating the coupled structure of the coolant heater, the first coolant pump, and the second coolant pump in the heat management system according to an embodiment of the present invention.

As illustrated in the drawings, the coolant heater 430 of the heat management system according to an embodiment of the present invention is a coolant heating means in which a coolant introduced through an inlet pipe 431 may be heated while flowing along the inside of a body, and then discharged through an outlet pipe 432. The coolant heater 430 may have a body formed in a rectangular parallelepiped shape, and may be formed in a shape in which the inlet pipe 431 through which the coolant is introduced and the outlet pipe 432 through which the coolant is discharged protrude from a front surface of the body in a width direction forward, which is toward one side of the body in the width direction. In addition, the inlet pipe 431 and the outlet pipe 432 may be formed on an upper side of the coolant heater 430 in a height direction, and may be disposed to be spaced apart from each other in a length direction. In addition, a fixing bracket 434 separately formed may be coupled to the coolant heater 430, and a first fixing part 435 and a second fixing part 436 formed separately may be further coupled to the fixing bracket 434. In this case, in a state in which the fixing bracket 434 is coupled to the coolant heater 430 and the first fixing part 435 and the second fixing part 436 are coupled to the fixing bracket 434, the first fixing part 435 may be disposed below the inlet pipe 431 of the coolant heater 430 in the height direction and the length direction and the second fixing part 436 may be disposed below the outlet pipe 432 of the coolant heater 430 in the height direction and the length direction. In addition, the second fixing part 436 may be disposed below the first fixing part 435 in the height direction.

The first coolant pump 450 is a means pumping the coolant, and may include a first inlet pipe 451 through which the coolant is introduced and a first outlet pipe 452 through which the coolant of which a pressure is raised inside is discharged. The first coolant pump 450 may be coupled to and fixed to the first fixing part 435 using a fastening means or the like, and may be disposed in front of the coolant heater 430 in the width direction, and the first inlet pipe 451 of the first coolant pump 450 may be disposed below the outlet pipe 432 of the coolant heater 430 in the height direction. In addition, the first inlet pipe 451 of the first coolant pump 450 may be formed to protrude from a right side surface of the first coolant pump 450 in the length direction rightward in the length direction, and the first outlet pipe 452 of the first coolant pump 450 may be formed to extend from a front side of the first coolant pump 450 in the width direction upward in the height direction.

The connection pipe 433 connects the outlet pipe 432 of the coolant heater 430 and the first inlet pipe 451 of the first coolant pump 450, and may be a flexible hose or the like for easy connection.

The second coolant pump 340 is also a means pumping the coolant, and may include a second inlet pipe 341 through which the coolant is introduced and a second outlet pipe 342 through which the coolant of which a pressure is raised inside is discharged. The second coolant pump 340 may be coupled and fixed to the second fixing part 436 using a fastening means or the like, may be disposed in front of the coolant heater 430, which is on one side of the coolant heater 430 in the width direction, and may be disposed below a lower surface of the coolant heater 430 in the height direction. In addition, the second inlet pipe 341 of the second coolant pump 340 may be formed to protrude from a left side surface of the second coolant pump 340 in the length direction leftward in the length direction, and the second outlet pipe 342 of the second coolant pump 340 may be formed to extend from a lower side of the second coolant pump 340 in the height direction rearward in the width direction.

Here, the first inlet pipe 451 of the first coolant pump 450 and the second inlet pipe 341 of the second coolant pump 340 may be disposed to overlap each other in the length direction, and as an example, as illustrated in the drawings, the first inlet pipe 451 of the first coolant pump 450 and the second inlet pipe 341 of the second coolant pump 340 may be disposed to be spaced apart from each other in the height direction. In addition, the first inlet pipe 451 of the first coolant pump 450 may be disposed to overlap a body and the second inlet pipe 341 of the second coolant pump 340 in the length direction, and the second inlet pipe 341 of the second coolant pump 340 may be disposed to overlap a body and the first inlet pipe 451 of the first coolant pump 450 in the length direction.

Accordingly, the first coolant pump 450 and the second coolant pump 340 are disposed, respectively, on the left side and the right side in the length direction, and a length from a left end of the first coolant pump 450 to a right end of the second coolant pump 340 may be formed as short as possible, such that the coolant system may be compactly configured. In addition, all of the inlet pipe 431 and the outlet pipe 432 of the coolant heater 430, the first coolant pump 450, and the second coolant pump 340 may be disposed on a front side of the coolant heater 430 in the width direction, the first coolant pump 450 and the second coolant pump 340 may be disposed to overlap each other in the width direction, and thus, a compact coolant system may be configured. In addition, the outlet pipe 432 of the coolant heater 430 and the first inlet pipe 451 of the first coolant pump 450 may be disposed relatively adjacent to each other, such that the connection pipe 433 may be formed to have a small length, and thus, the coolant may smoothly flow from the coolant heater 430 toward the first coolant pump 450.

In addition, the first outlet pipe 452, which is the coolant outlet of the first coolant pump 450, may be formed an upper side of the first coolant pump 450 in the height direction, and may be formed to extend from a front side of the first coolant pump 450 in the width direction upward. In addition, the second outlet pipe 342 of the second coolant pump 340 may be formed on an opposite side to the first outlet pipe 452 of the first coolant pump 450, and may be formed to extend from the lower side of the second coolant pump 340 in the height direction rearward in the width direction. Therefore, the first outlet pipe 452 of the first coolant pump 450 and the second outlet pipe 342 of the second coolant pump 340 are formed from far sides toward different directions, respectively, such that the coolant pumps may be compactly disposed, and pipes may be easily connected to the outlet pipes.

In addition, the first fixing part 435 may include a 1-1-th fixing part 435-1 and a 1-2-th fixing part 435-2, the 1-1-th fixing part 435-1 may be coupled and fixed to the fixing bracket 434 coupled to the coolant heater 430, by fastening means such as bolts, and the 1-2-th fixing part 435-2 may be coupled and fixed to the 1-1-th fixing part 435-1 by fastening means such as bolts. In addition, the first coolant pump 450 may be interposed and fixed between the 1-1-th fixing part 435-1 and the 1-2-th fixing part 435-2. Here, since the first coolant pump 450 has a body formed in a generally cylindrical shape, a front surface of the 1-1-th fixing part 435-1 and a rear surface of the 1-2-th fixing part 435-2 are concavely formed, such that the first coolant pump 450 may be fixed to the first fixing part 435 in a shape in which the 1-1-th fixing part 435-1 and the 1-2-th fixing part 435-2 surround the first coolant pump 450.

Similarly, the second fixing part 436 may also include a 2-1-th fixing part 436-1 and a 2-2-th fixing part 436-2, the 2-1-th fixing part 436-1 may be coupled and fixed to the fixing bracket 434 coupled to the coolant heater 430, by fastening means such as bolts, and the 2-2-th fixing part 436-2 may be coupled and fixed to the 2-1-th fixing part 436-1 by fastening means such as bolts. In addition, the second coolant pump 340 may be interposed and fixed between the 2-1-th fixing part 436-1 and the 2-2-th fixing part 436-2. Here, since the second coolant pump 340 also has a body formed in a cylindrical shape, a front surface of the 2-1-th fixing part 436-1 and a rear surface of the 2-2-th fixing part 436-2 are concavely formed, such that the second coolant pump 340 may be fixed to the second fixing part 436 in a shape in which the 2-1-th fixing part 436-1 and the 2-2-th fixing part 436-2 surround the second coolant pump 340.

In addition, the first inlet pipe 451 of the first coolant pump 450 may be disposed so as not to overlap the second fixing part 436 in the width direction and the height direction, and the second inlet pipe 341 of the second coolant pump 340 may be disposed so as not to overlap the first fixing part 435 in the width direction and the height direction. That is, as illustrated in the drawings, when viewed from the left in the length direction, the first fixing part 435 is formed so as not to cover the second inlet pipe 341 of the second coolant pump 340, such that a hose or a pipe may be easily connected to the second inlet pipe 341 of the second coolant pump 340 in the length direction. Similarly, when viewed from the right in the length direction, the second fixing part 436 is formed so as not to cover the first inlet pipe 451 of the first coolant pump 450, such that the connection pipe 433 may be easily connected to the first inlet pipe 451 of the first coolant pump 450 in the length direction.

Accordingly, in the coolant system according to the present invention, a distance between components constituting the coolant system for interior heating of the vehicle and cooling and heating of the electronic components is decreased, such that pressure loss of the coolant in pipes connecting the components to each other may be decreased, performance of the coolant system may be improved, the coolant system may be compactly configured, and assemblability of the components constituting the coolant system may be improved.

In addition, end portions of the fixing bracket 434 to which the coolant heater 430, the first coolant pump 450, and the second coolant pump 340 are coupled and fixed may be coupled and firmly fixed to a vehicle body or surrounding components.

In addition, the inlet pipe 431 of the coolant heater 430 may be connected to a coolant outlet of the water-cooled condenser 220. In addition, the first outlet pipe 452 of the first coolant pump 450 is connected to the heater core 440, such that the coolant heated by the coolant heater 430 may be supplied to the heater core 440 through the first coolant pump 450 to be used for heating in winter. In this case, the coolant passing through the heater core 440 may also heat the electronic component 460 while passing through the electronic component 460. In addition, the second inlet pipe 341 of the second coolant pump 340 is connected to the reservoir tank 370, and the second outlet pipe 342 of the second coolant pump 340 is connected to the temperature control object 350 side, such that the temperature control object 350 may be cooled or heated using the coolant.

The present invention is not limited to the embodiments described above, and may be applied to various fields. In addition, the present invention may be variously modified by those skilled in the art to which the present invention pertains without departing from the gist of the present invention claimed in the claims. For example, it has been described in the above embodiment that the air conditioner 150 is disposed in the interior 520, but the air conditioner 150 may also be disposed in the engine room 510. In a case of an electric vehicle, there is no engine in the engine room 510. Therefore, even though the air conditioner 150 is provided in the engine room 510, there is no problem in utilizing a space of the engine room 510, and the air conditioner 150 may be removed from the interior 520, and thus, the interior 520 may be more sufficiently utilized. Even though the air conditioner 150 is disposed in the engine room 510, a duct connecting the air conditioner 150 and the interior 520 to each other should be provided.

DETAILED DESCRIPTION OF MAIN ELEMENTS

150: air conditioner, 151: temperature control door
152: blower
200: refrigerant system, 210: compressor
220: water-cooled condenser, 225: first expansion valve
230: air-cooled condenser, 233: refrigerant heat exchanger
240: second expansion valve, 242: evaporator
251: third expansion valve, 252: chiller
260: accumulator, 270: first connection block
300: coolant system, 301: heating line
302: cooling line, 302-1: first connection line
302-2: second connection line, 302-3: third connection line
310: radiator, 311: cooling fan
312: second coolant joint, 313: first coolant joint
320: second directional selector valve, 330: third directional selector valve
340: second coolant pump
341: second inlet pipe, 342: second outlet pipe
350: temperature control object, 370: reservoir tank
410: first directional selector valve, 420: third coolant pump
430: coolant heater
431: inlet pipe, 432: outlet pipe
433: connection pipe, 434: fixing bracket
435: first fixing part
435-1: 1-1-th fixing part, 435-2: 1-2-th fixing part
436: second fixing part
436-1: 2-1-th fixing part, 436-2: 2-2-th fixing part
440: heater core, 450: first coolant pump
451: first inlet pipe, 452: first outlet pipe
460: temperature control object
510: engine room, 520: interior
530: trunk

The invention claimed is:

1. A heat management system comprising:
a coolant heater heating a coolant;
a first coolant pump connected to a coolant inlet or a coolant outlet of the coolant heater to pump the coolant and coupled to the coolant heater; and
a second coolant pump connected to a temperature control object side to pump the coolant and coupled to the coolant heater,
wherein the coolant heater, the first coolant pump, and the second coolant pump are disposed in an engine room of a vehicle,
wherein the coolant heater has an inlet pipe and an outlet pipe formed on one side of the coolant heater based on a width direction of the coolant heater, the inlet pipe is a coolant inlet, and the outlet pipe is a coolant outlet,
wherein the first coolant pump and the second coolant pump are disposed on one side of the coolant heater based on the width direction,
wherein a first inlet pipe of the first coolant pump and a second inlet pipe of the second coolant pump are disposed to be spaced apart from each other in a height direction,
wherein the first coolant pump is disposed on one side based on a length direction, and the second coolant pump is disposed on the other side based on the length direction, wherein the first inlet pipe, which is a coolant inlet of the first coolant pump, and the second inlet pipe, which is a coolant inlet of the second coolant pump, are formed to protrude from surfaces facing each other, the first inlet pipe and the second inlet pipe protruding in the length direction in a direction in which the first inlet pipe and the second inlet pipe face each other, and wherein the first inlet pipe of the first coolant pump and the second inlet pipe of the second coolant pump are disposed to at least partially overlap each other in the length direction.

2. The heat management system of claim 1, wherein a coolant inlet of the first coolant pump is connected to the coolant outlet of the coolant heater, and the first coolant pump is disposed below the coolant outlet of the coolant heater in a height direction.

3. The heat management system of claim 2, further comprising
a connection pipe connecting the coolant outlet of the coolant heater and the coolant inlet of the first coolant pump to each other.

4. The heat management system of claim 1, wherein the first inlet pipe of the first coolant pump is disposed to overlap a body and the second inlet pipe of the second coolant pump in the central axis direction of the first inlet pipe or the second inlet pipe, and
the second inlet pipe of the second coolant pump is disposed to overlap a body and the first inlet pipe of the first coolant pump in the central axis direction of the first inlet pipe or the second inlet pipe.

5. The heat management system of claim 1, wherein a first outlet pipe which is a coolant outlet of the first coolant pump is formed on an upper side of the first coolant pump in a height direction, and a second outlet pipe which is a coolant outlet of the second coolant pump is formed on an opposite side to the first outlet pipe in the height direction.

6. The heat management system of claim 1, wherein a fixing bracket separately formed is coupled to the coolant heater, and a first fixing part to which the first coolant pump is coupled and a second fixing part to which the second coolant pump is coupled are formed on the fixing bracket.

7. The heat management system of claim 6, wherein the first fixing part includes a 1-1-th fixing part coupled and fixed coupled to the coolant heater and a 1-2-th fixing part coupled and fixed to the 1-1-th fixing part, and the first coolant pump is disposed and fixed between the 1-1-th fixing part and the 1-2-th fixing part.

8. The heat management system of claim 6, wherein the second fixing part includes a 2-1-th fixing part coupled and fixed coupled to the coolant heater and a 2-2-th fixing part coupled and fixed to the 2-1-th fixing part, and the second coolant pump is disposed and fixed between the 2-1-th fixing part and the 2-2-th fixing part.

9. The heat management system of claim 1, wherein the coolant inlet of the coolant heater is connected to a coolant outlet of a water-cooled condenser in which a refrigerant and the coolant exchange heat with each other.

10. The heat management system of claim 1, wherein a coolant outlet of the first coolant pump is connected to a heater core exchanging heat with air supplied to an interior of the vehicle.

11. The heat management system of claim 1, wherein a coolant inlet of the second coolant pump is connected to a reservoir tank storing and replenishing the coolant, and a coolant outlet of the second coolant pump is connected to the temperature control object side.

* * * * *